D. D. Armes.
Grain Meter.

No. 53,553. Patented Apr. 3, 1866.

Witnesses.
W. H. Burridge
A. W. McClelland

Inventor.
Armes

UNITED STATES PATENT OFFICE.

D. D. ARMES, OF DECORAH, IOWA.

IMPROVEMENT IN WEIGHING AND MEASURING GRAIN.

Specification forming part of Letters Patent No. 53,553, dated April 3, 1866.

*To all whom it may concern:*

Be it known that I, D. D. ARMES, of Decorah, in the county of Winneshiek and State of Iowa, have invented certain new and useful Improvements in a Machine for Weighing and Measuring Grain; and I do hereby declare that the following is a full and complete description of the construction and operation of the same, reference being had to the accompanying drawings, making a part of this specification, in which—

Figure 1:
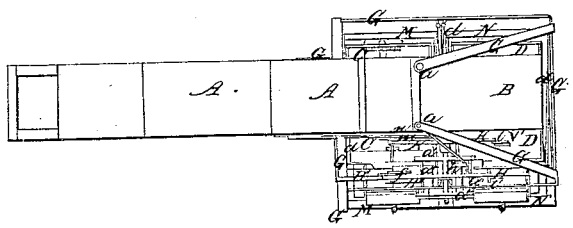
Figure 2:
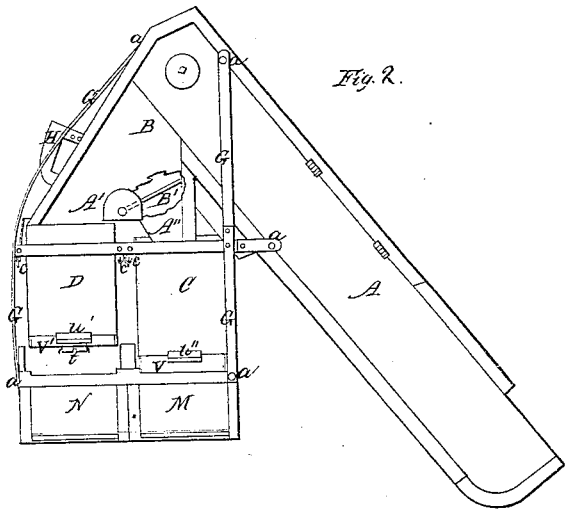
Figures 3, 5:
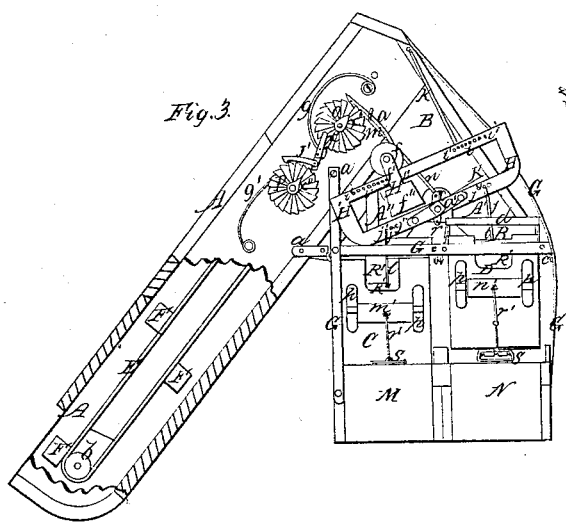
Figure 4:
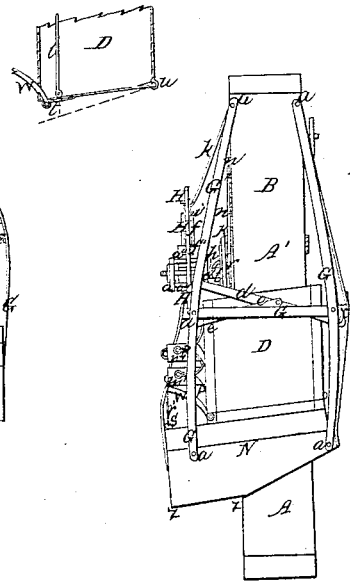

Figure 1 is a top view of the machine. Fig. 2 is a side view. Fig. 3 is a view of the side opposite from Fig. 2. Fig. 4 is a sectional view.

Like letters of reference refer to like parts in the different views.

My improvement relates to a machine for measuring and weighing grain in bulk that is self-sacking and self-tallying in its operation, as hereinafter described.

A in the several figures represents the frame or case of the elevator, in which are arranged pulleys at the upper and lower ends, as seen at $b$ in Fig. 3, over which an endless belt, E, runs, that has boxes or elevators F attached to it for containing the grain as it is carried up by the endless belt. At the upper end of the elevator is a spout, B, in which there are chutes A' A'' for conveying the grain into the boxes.

C and D are boxes hung underneath the chutes by bails $d$, that extend round in front of the boxes along the sides, and are connected at the rear end, by wires $c$, to a metallic framework, G, surrounding the boxes, and attached at $a$ to the case or frame and to shoes or spouts M N below the boxes, whereby the shoes are supported in place. To each side of the bails $d$, about the middle, is attached an arm, $e$, as seen in Fig. 4, that is connected by a wire to the front of the frame G at $c'$. In this way the boxes are hung so as to rise up and down in the desired manner for measuring and weighing the grain.

To the middle, on the inside of the bails, is attached a wire, $j$, that is hooked at the upper end into one of the holes $j'$ in a scale-beam, H H', as shown in Fig. 3. This scale-beam is hung or balances in the middle on a scale-beam shaft, $h$, that extends through the case, where it has its bearing. To the shaft, inside of the case, is attached a cut-off, B', whereby the grain is cut off and guided alternately through the chutes A' A''. On each side of the scale-beam are stays $a'$, that the shaft $h$ passes through, and in the ends of which are rods $a''$, that extend through the scale-beam.

H'' is a rolling weight arranged on the scale-beam, that consists of a roller, $f$, grooved so as to run on the upper edge of the beam, and is connected by arms $f'$ to the weight $f''$.

In the upper part of the scale-beam are holes $i$, in which pins $i'$ are placed, to guide the distance that the rolling weight runs on the scale in the process of measuring and weighing the grain.

On the shaft $h$, between the scale-beam and case, is a cross-bar, K, to the ends of which are attached wires $l$, that extend down and are attached at the lower end to the bottom of the boxes, as seen in Fig. 5; and on the other side of this bar there is a lever, $r$, to each end of which is attached dogs $m$ $n$, that extend up and work in ratchet-teeth in a tallying-wheel, O, on the side of the case. (Seen in Fig. 3.)

P is another tallying-wheel, that is turned by means of a pin, $x$, on the wheel O coming against an arm or lever, J, pivoted to one end of a dog, J', that catches in ratchet-teeth round the wheel P, so that every time the wheel O turns round once it moves the wheel P one notch.

$g$ is a spring to move the arm J back in place after it has been turned up by the pin, and $g'$ is another spring coming against the notches of the wheel P, causing it to move steadily and preventing it from turning back.

There is designed to be an index on the face of the tallying-wheels O and P, by which the pointers $x$ and $x'$ will note the movements and revolutions of the wheels, counting the weights and measures, numbering from one to four hundred.

In front of the boxes there are openings R, (seen in Fig. 3,) in which there are slides R', that can be moved up or down.

$m'$ and $n'$ are cups hung near the outer end to arms $p$, extending out from the front of the boxes. To the front side of the cups are attached rods $r'$, that are connected at the lower end to links S attached to top of the shoes M N.

The boxes C and D are hung inclining downward toward the front, and the sides are of a rhomboid shape, as shown in Fig. 4. The bottoms V V' of the boxes are hinged to them at the rear end, as seen at $u'\, u''$ in Fig. 2, and at the front there is a latch, W, hinged to the bottom at $t$, and extends up through a slot in the front of the boxes, where the under side of the latch, by means of a notch cut out, catches onto the edge of the slot, as shown in Fig. 5, so that by raising the outer end of the latch the catch is disengaged from the box, when the bottom can be let down, as noted by the dotted line in Fig. 5.

The bottoms of the shoes M N incline downward toward the front, and from $z$ to $z'$ there are openings for the grain to run through as it is discharged from the boxes.

The manner in which this machine as constructed operates is as follows: It may be connected to the thrasher, so as to receive the grain, which is carried up in the elevators F to the measuring-boxes, where it can either be measured or weighed by bulk. The bottom of one of the boxes is first closed and latched—for instance, the box D, as represented in the drawings—and the cut-off is turned so that the grain is guided through the chute A' into this box, filling it up until the weight of the grain in the box will depress the end H of the scale-beam, when the rolling weight will run down until arrested by the pin, which is adjusted in one of the holes $i'$, according to the quantity of grain desired to be weighed. As the box thus desends the latch W strikes against the link S or top of the shoe, which turns up the latch so as to unlatch the bottom, when it inclines downward from the rear end, so that the grain flows out, running through the opening in the bottom of the shoe, into a bag attached to the shoe to receive it, or into a bin, as the case may be. As the bottom of the box D opens it closes the bottom of the other box by means of the connecting-rods $l$ attached to the bottom and end of the bar K, for as the bottom of one box descends it depresses one end of the bar and elevates the other, closing the bottom of one box and opening the other, and this turns the scale-shaft, so that the cut-off B' is turned so as to guide the grain into the elevated box to be filled. In this way the boxes fill in the process of being measured and weighed alternately. As the scale-beam and bar K incline downward, they turn the shaft $h$, moving the lever $r$, so as to operate the dogs $m\, n$ that work in the tally-wheel O. As the box D descends it draws down the dog $n$, so that it turns the tally-wheel one notch, and as the box C descends the lever $r$ is inclined so that the dog $m$ turns the wheel one notch, which is noted by the pointer $x'$ on the index. The revolutions of the wheel O are indicated on the tally-wheel P, as before stated. Thus from one to four hundred weights or measures can be enumerated.

The measuring of grain by bulk is accomplished by adjusting the slide R, so as to gage the right amount that will be contained in the box for a bushel or half-bushel, and so that a small portion will run over through the opening R into one of the cups $m'$ or $n'$, that will cause the cup to tip down inward toward the box, the cup being hung near the outer end, when the grain in the said cup will be emptied into the spout or shoe below, and in doing this it unlatches the bottom of the box immediately by the action of the box as it turns downward, striking against the latch W, Fig. 5, allowing the grain to escape through the opened bottom; and as the bottom is let down it inclines the lever-bar, turning the scale-beam, shaft, tally-wheels, and guides in the spout, filling the boxes alternately, operating in the same manner as before described for weighing the grain.

The weight of the grain in both measuring and weighing operates all parts of the machine excepting elevating the grain, which can be done in any desired manner.

$k$ is a brace attached to the case, and enters one of the holes of the scale-beam for holding the scale-bar steady when measuring by bulk.

What I claim as my improvement, and desire to secure by Letters Patent, is—

1. The combination of the measuring-boxes C D, slides R' R', and bails $d\, d$, and arms $e\, e$, substantially as and for the purpose set forth.

2. The self-emptying cups $m'\, n'$, in combination with the rods $r'\, r'$ and links S S, substantially as and for the purpose set forth.

3. The arrangement of the shoes M N, links S S, and rods $r''\, r''$, in combination with the cups $m'\, n'$, rods $l\, l$, bar K, and boxes C D, substantially as and for the purpose set forth.

D. D. ARMES.

Witnesses:
 WILLIS WHEELOCK,
 A. K. BAILEY.